Figure 1:
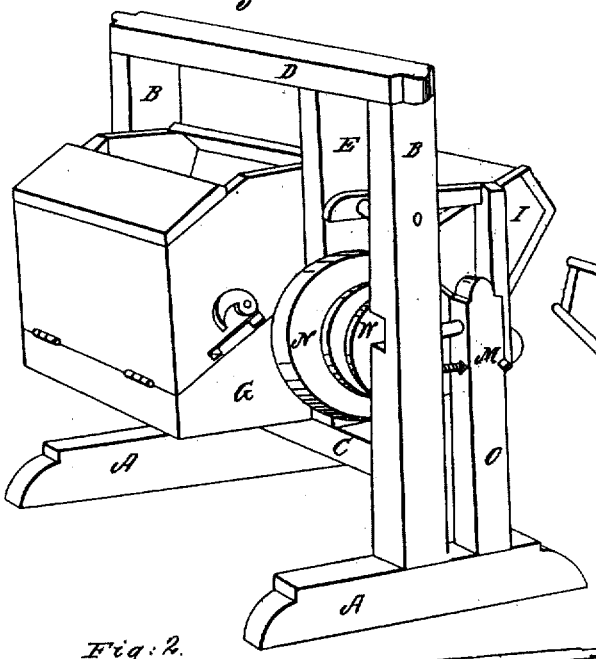
Figure 3:
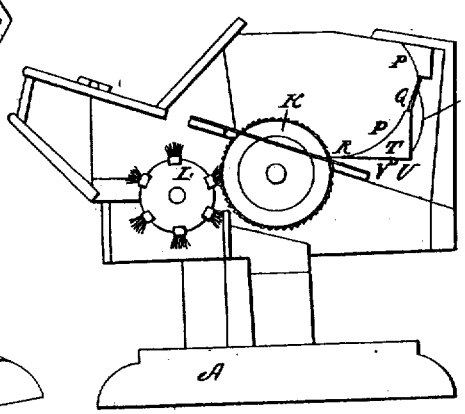
Figure 2:
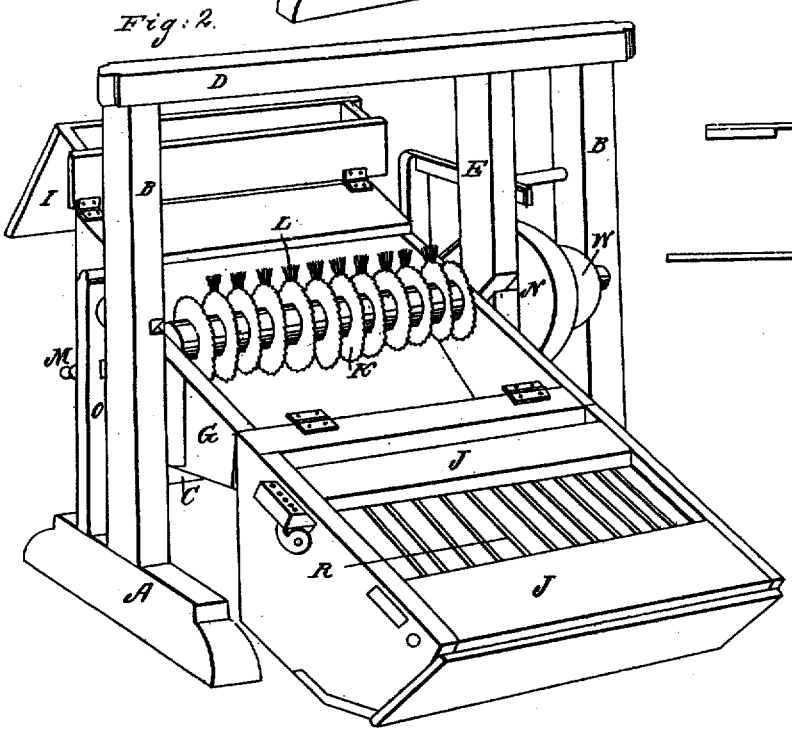
Figure 4:
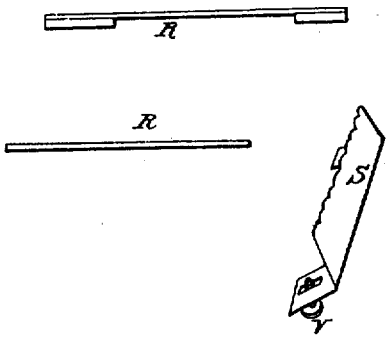

9885X

J. McCREIGHT.

Cotton Gin.

Patented July 2, 1836.

N. PETERS, Photo-Lithographer, Washington, D. C.

9885X July 2. 1836 ar. 15 371.

James McCreight
Letters Patent

The schedule referred to in these Letters Patent, and making part of the same containing a description in the words of the said James McCreight him-
self of his improvement in the Reversed Cotton Gin To all whom it may concern
Be it known that I James McCreight of the town of Winnsborough District
of Fairfield in the State of South Carolina have invented certain new,
and useful improvements in the Cotton Saw Gin Called "McCreights
Reversed Cotton Gin" which are described as follows, reference being had to
the annexed drawings of the same making part of this specification. The frame
of the reversed gin consists of two sills (marked A in the annexed drawings)
2 feet 9 inches long of scantling 6 inches by 4 placed on their edge with a mortise
through the centre of each to receive two main posts marked B four feet
3 inches long of scantling 6 inches by 4, with a mortise one foot above the
top of the sills to receive a rail the length of the frame of scantling 6 inches
by 4 marked C. tenoned at the top to receive a cap marked D of scantling
6 inches by three. The rail & cap are mortised to receive the [illegible] marked E
The posts to carry the brush are marked O. and let into the sills at one end two
inches in one of the main posts and a screw bolt at the other end. The posts
are 2 feet 4 inches above the sills of scantling 4 by 4 inches: the plank at the
ends of the brush marked G. forms a by around the brush and for the falling breast
to rest on. The hopper board is composed of two pieces of 1½ inch plank worked out
to the segment of a circle the lower edge fitted on the slats the upper edge having
wires inserted into it about one inch apart, The narrow piece of the hopper board
is let down on the wires until it comes within 3 inches of the other piece both be-
ing made fast. The comb is made of sheet iron or steel 3½ inches broad with
notches opposite the wires; fastened on a board and standing nearly perpendicu-
lar working on an iron pin with a screw below to put the comb to or from the
rolls. I the funnel turning on hinges. J moveable board to which the slats are
fastened. K. saws. L. brush. M. regulating screws and boxes of the brush. N.

9885[illegible]

N. pulleys and band. P. hopper board. R. screw to set in the hopper board.
S. slats. [illegible] comb. T. board to which the comb is fastened. U. iron pins on
which the comb turns V. screw to set the comb W. driving pulley.
The frame funnel, saws, brush & gearing, are made in the usual manner.
The machine is driven by horse, steam or other power. The improvement
which I have made and desire to secure by Letters Patent consist principally
in giving a direction to the rotation of the saws contrary to that of the common
gin, that is the saws turn towards the feed board instead of from it.
The advantages derived from this and the other improvements are. 1. A great portion of
the motes false seed, sand and trash being thus discharged before the picked
cotton reaches the current of air about the brush. the picked cotton consequently
passes cleaner from the gin, while on the other hand in the common gin a great
portion of sand, motes, false seeds and trash having to pass directly through the
current of air when the picked cotton is floating mixes with it and in consequence
thereof a part of the cotton either sinks down with the trash or the trash rises and
passes with the cotton through the funnel. 2. The seed are discharged as soon
as picked, while in the common gin the seed has to pass round to where the seed
cotton is put in, and some seed is always carried that ought to be discharged. by which
means the seed is apt to be dropped in an irregular manner. 3 the weight of a large
roll of cotton lies directly on the saws. which roll cannot be broken by over feeding
or a sudden jerk of the edge wheel while in the common gin the roll being [illegible]
behind the saws is raised up and falls forward causing it to become hollow
and over feeding or a sudden jerk of the edge wheel breaks and often throws it out.
4. The picking in this machine being done on the descent of the ribs a hard sub-
stance finding its way to the saws cannot remain there nor injure the teeth;
while in the common gin the hard substance separates from the roll and
lodging against the saws often destroys a number of the teeth and sometimes
the saws altogether are destroyed. 5. The hopper or finger board in the [illegible] gin
is fixed and stationary having a rack and comb behind it which by pressing against
the roll when the gin is in motion brings off the seed freely and with great regular-
ity. while in the common gin the feed board being immovable either lets the seed
out with too much cotton in it or by retaining the seed too long the cotton is
slowly ginned thus occasioning a loss of cotton or a loss of time. 6. The sand,
false

9885X

343.

false seed, motes, small leaf and other trash pass out with the seed and no good cotton is lost in any way: while in the common gin much cotton is matted and lost and comparatively imperfectly cleaned from the causes before stated, which causes are entirely removed by the improvements now made in the cotton gin Witnesses
James Cathcart
W. A. McCreight Jas. McCreight Drawing Ex.d
AJW.

10 20 m